United States Patent [19]

Sweeney

[11] 4,022,002
[45] May 10, 1977

[54] GIANT HAY BALER

[76] Inventor: John F. Sweeney, Box 1434, Ferndale, Wash. 98248

[22] Filed: Aug. 21, 1975

[21] Appl. No.: 606,652

[52] U.S. Cl. .............................................. 56/341
[51] Int. Cl.² ........................................ A01D 89/00
[58] Field of Search ................... 56/341, 343–360; 100/240, 245, 250

[56] References Cited

UNITED STATES PATENTS

| 523,707 | 7/1894 | Keith | 56/341 |
| 3,035,391 | 5/1962 | Dutschmann et al. | 56/341 |
| 3,552,109 | 1/1971 | Murray et al. | 56/343 |
| 3,591,950 | 7/1971 | Weichel | 56/344 X |
| 3,751,892 | 8/1973 | Quanbeck et al. | 56/344 |
| 3,771,673 | 11/1973 | Moeller | 56/346 X |

Primary Examiner—J.N. Eskovitz
Attorney, Agent, or Firm—Robert B. Hughes

[57] ABSTRACT

A relatively large sized baler for hay, the baler being mounted upon wheels so that it can be pulled by a tractor across a field for picking up hay, the baler consisting of a box-like frame open at its front end so that the hay can be admitted thereinto, a forwardly and rearwardly movable plunger being provided with a row of teeth for compressing it against a vertically upstanding ramp after which the hay is tied up in its compressed condition and the ramp is then rearwardly downwardly pivoted so that the bale of hay can then be dropped out of the baler.

3 Claims, 2 Drawing Figures

U.S. Patent
May 10, 1977
4,022,002
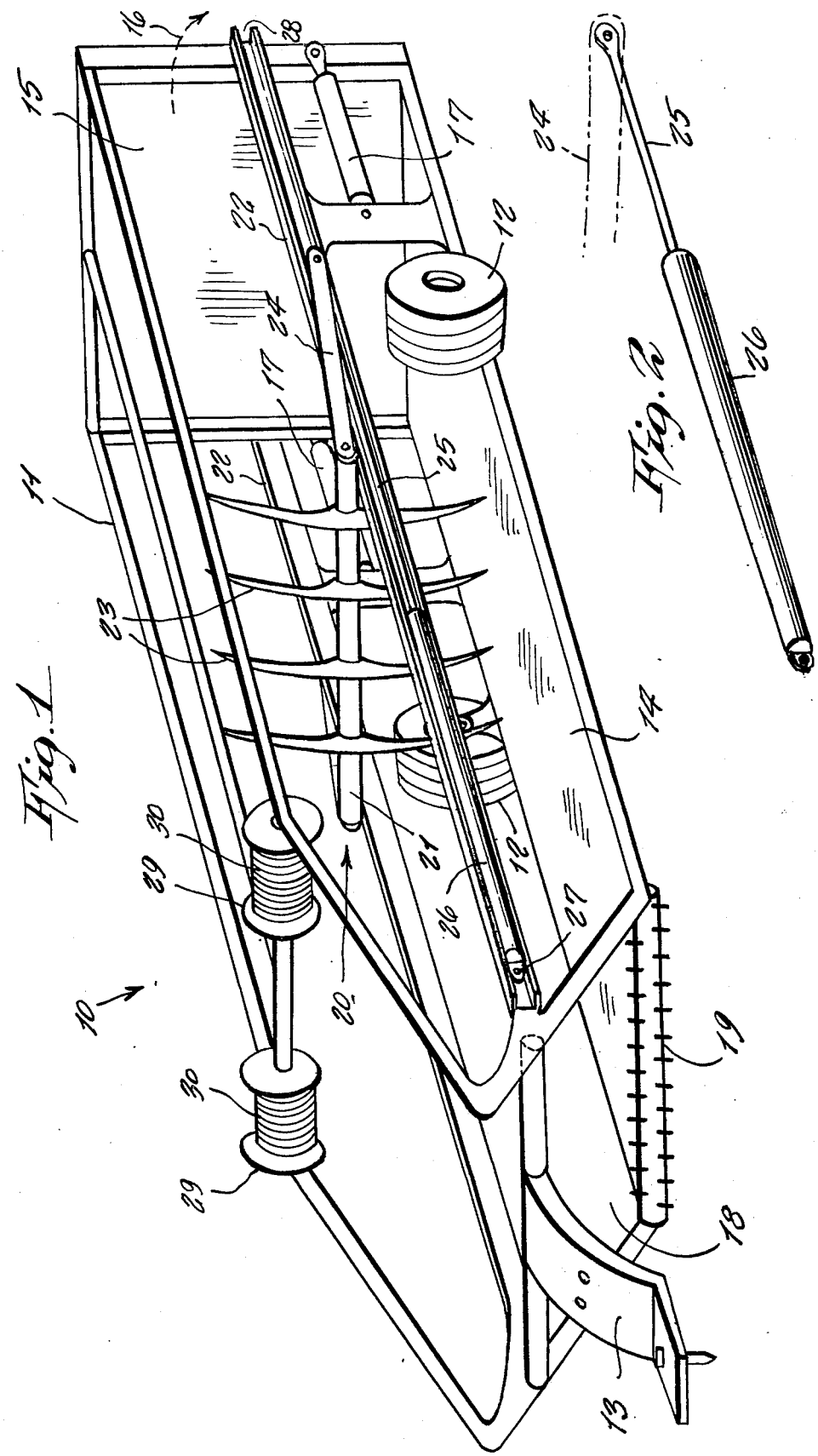

GIANT HAY BALER

This invention relates generally to agricultural equipment. More specifically it relates to hay balers.

A principal object of the present invention is to provide a hay baler which is of relatively large size so to produce large bales of hay, the baler being adaptable to be pulled behind a tractor across a hay field so that the hay can be drawn directly into the interior of the baler, the baler thereafter pushing the bale of hay out of a rear end thereof.

Another object of the present invention is to provide a giant hay baler which is trouble free and which is labor saving.

Still another object of the present invention is to provide a giant hay baler which can be made in any desired size so to produce any size of baled hay, and which can be pulled by any type of tractor or equipment.

Other objects are to provide a giant hay baler which is simple in design, inexpensive to manufacture, rugged in construction, easy to use and efficient in operation.

These and other objects will be readily evident upon a study of the following specification and the accompanying drawing wherein:

FIG. 1 is a front perspective view of the present invention.

FIG. 2 is a perspective view showing one of the hydraulic cylinders of the plunger thereof in order to more clearly show its tapered design.

Referring now to the drawing in detail, the reference numeral 10 represents a giant hay baler according to the present invention wherein the same includes a box-like frame 11 which at its rear end is supported upon a pair of wheels 12. The forward end of the frame includes a hitch 13 for being detachably connected to any type of tractor or other equipment. The bottom of the frame includes a horizontal floor 14 and the rear end of the frame supports a ramp 15 which is pivotable between an upright vertical position as shown in FIG. 1, and a rearwardly down position as indicated by the directional arrow 16. A pair of hydraulic cylinders 17 mounted on each side of the frame 11 are connected to opposite side edges of the ramp and serve to lower or raise the ramp between the vertical and downward position.

The forward end of the frame has an opening 18 for admitting hay into the interior of the frame, and a forward edge of the floor 14 is adjacent a hay pick-up 19.

Within the interior of the frame there is a plunger 20 which consists of a transverse extending member 21, the opposite ends of which rest upon a pair of rearwardly-forwardly extending channels 22 and which are integrally secured to the frame 11. The plunger member 21 supports a plurality of double-pointed teeth 23 as shown in FIG. 1. Each opposite end of the plunger member 21 is connected pivotally to an arm 24 which at its rear end is connected pivotally free to a piston rod 25 of a piston that travels within a hydraulic cylinder 26, a forward end of the cylinder being secured by means of a pivot pin 27 to the channel 22 rigidly affixed to the frame 11.

It is now apparent from this construction that the plunger and its teeth are thus adaptable to slide forwardly and rearwardly within the interior of the frame 11. The hydraulic cylinders 26 and their piston rods are fitted within the longitudinal groove 28 of the channel 22, thereby establishing the directional travel for the plunger.

A pair of spools 29 are also supported upon the frame 11, each spool carrying a roll of wound-up wire, cable, strapping, rope or the like and which is used for tying up the hay into the bale.

In operative use, the giant hay baler is pulled by the tractor or other equipment. Hay is picked up in rows in the field and enters over the hay pick-up 19. The plunger 20 travels forwardly and the teeth on the plunger swing backward so to allow the hay to pass underneath on the forward stroke thereof. At the front end of the frame, the plunger rides a rail upwards so to lift the plunger teeth up out of the way of the incoming hay. This is caused by the two lateral ends of the transverse bar of the plunger 21 engaging the two laterally spaced upwardly and forwardly inclined surfaces located just forward of the pivot pins 27. Thus, as the plunger 21 moves forwardly of the location of the pivot pines 27, it travels in an upward and forward direction out of the way of the incoming hay. After sufficient hay has entered, the plunger then travels towards the rear, picking up all the hay in front thereof, thus compressing the hay against the ramp 15. The wire, cable, rope or the like shown at 30 is then pulled from the spools and is rapped around the compressed hay so that the same is then in the form of a bail. After thus being tied, the hydraulic cylinder 17 is operated so to cause the ramp to pivot downwardly out and the bale thus formed is then allowed to be pushed outward thereupon and out of the machine.

It is to be noted that the actual tying of the hay into the bale with the wire or rope 30 is accomplished manually. It is also to be noted that there are two tailgate rams, and the hydraulic rams are shown herein as single-staged, but it is understood that these could be multiple-staged hydraulic rams.

Thus there is provided a giant hay baler. In one design thereof, it may be 7 ft. by 8 ft. by 34 ft. long.

While various changes may be made in the detailed construction, it is understood that such changes will be within the spirit and scope of the present invention as is defined by the appended claims.

What I claim is:

1. A Giant Hay Baler, comprising in combination, an elongated rectangular frame supported at its rear end upon a pair of wheels, a forward end of said frame including a hitch for being detachably connected to a tractor or other equipment, an opening at said forward end so to admit hay upon a floor at a lower end of said frame, a ramp supported at a rear end of said frame and being pivotable between an upward vertical position and a horizontal rearwardly down position by means of hydraulic rams on said frame, said frame including a longitudinally extending channel along each side thereof, a plunger including a transverse member resting upon said channels, a plurality of vertical, parallel, double-pointed teeth carried by said transverse member, each tooth including a downward point at its lower end and an upward point at its upper end, a longitudinally mid portion of said teeth being connected to said transverse member, opposite ends of said transverse member being each pivotally connected by a link to a piston rod of a hydraulic cylinder contained within said channel.

2. The combination as set forth in claim 1 wherein a hay pick up is located at a forward end of said floor and at a lower end of said forward end opening.

3. The combination as set forth in claim 2, wherein a pair of spools are mounted upon said frame, each said spool carrying a roll of baling material.

* * * * *